(12) United States Patent
Goorhuis

(10) Patent No.: US 7,323,202 B2
(45) Date of Patent: Jan. 29, 2008

(54) COMPOSITION FOR FORMING A CASING AND METHOD OF USE

(75) Inventor: Johannes Goorhuis, Amersfoort (NL)

(73) Assignee: W. Ruitenberg Czn. N.V., Twello (NL)

( * ) Notice: Subject to any disclaimer, the term of this patent is extended or adjusted under 35 U.S.C. 154(b) by 167 days.

(21) Appl. No.: 10/362,286

(22) PCT Filed: Aug. 27, 2001

(86) PCT No.: PCT/NL01/00628

§ 371 (c)(1),
(2), (4) Date: Feb. 25, 2003

(87) PCT Pub. No.: WO02/15715

PCT Pub. Date: Feb. 28, 2002

(65) Prior Publication Data

US 2004/0037922 A1     Feb. 26, 2004

(30) Foreign Application Priority Data

Aug. 25, 2000   (NL) .................................. 1016018

(51) Int. Cl.
*A22C 13/00* (2006.01)
*A23L 1/0526* (2006.01)
*A23L 1/0528* (2006.01)
*A23L 1/0532* (2006.01)
*B65D 81/34* (2006.01)
*B65D 85/08* (2006.01)

(52) U.S. Cl. ...................... 426/105; 426/140; 426/573; 426/575

(58) Field of Classification Search ................. 426/89, 426/92, 105, 138, 140, 273, 573, 575
See application file for complete search history.

(56) References Cited

U.S. PATENT DOCUMENTS

| | | | |
|---|---|---|---|
| 2,611,708 A | 9/1952 | Owens et al. | |
| 2,802,744 A | 8/1957 | Weingand | |
| 4,676,976 A * | 6/1987 | Toba et al. | .................. 424/485 |
| 4,851,394 A * | 7/1989 | Kubodera | .................... 514/54 |
| 5,096,754 A | 3/1992 | Hammer et al. | |
| 5,108,804 A * | 4/1992 | Oxley et al. | ................ 428/34.8 |
| 5,356,654 A | 10/1994 | Speirs et al. | |
| 6,902,783 B1 * | 6/2005 | Hammer et al. | ........... 428/34.8 |

FOREIGN PATENT DOCUMENTS

| | | |
|---|---|---|
| EP | 0 228 319 | 7/1987 |
| EP | 0 619 077 A1 | 10/1994 |
| FR | 2 639 193 | 5/1990 |
| FR | 2 785 265 | 5/2000 |
| GB | 711437 | 6/1954 |
| GB | 807863 | 1/1959 |
| GB | 883 976 | 12/1961 |
| GB | 1 055 373 | 1/1967 |
| GB | 1 491 997 | 11/1977 |
| GB | 1 596 294 | 8/1981 |
| GB | 2 149 639 | 6/1985 |
| NL | 102930 | 11/1962 |
| NL | 9100711 | 11/1992 |
| WO | 93/12660 A1 | 7/1993 |
| WO | WO 99/55165 | 11/1999 |
| WO | WO 00/67582 | 11/2000 |

* cited by examiner

*Primary Examiner*—Arthur L. Corbin
(74) *Attorney, Agent, or Firm*—Browdy and Neimark, PLLC

(57) ABSTRACT

A composition for coating foodstuffs is described, where the composition comprises a first polysaccharide that is negatively charged in the composition and gels under the influence of cations, and at least a second polysaccharide which is neutral in the composition. A method for producing an edible coating is also described, as well as a method for coating foodstuffs. A coating formed by the first-named method and a foodstuff which contains such a coating are furthermore disclosed.

30 Claims, No Drawings

COMPOSITION FOR FORMING A CASING AND METHOD OF USE

FIELD OF THE INVENTION

The invention relates to a composition for coating foodstuffs which comprises a first polysaccharide that is negatively charged in the composition and gels under the influence of cations, as well as a method for coating foodstuffs.

BACKGROUND OF THE INVENTION

It is generally known in the food industry to coat foodstuffs such as sausage material, for example, with a coating (hereinafter also referred to as coating composition and also called "sausage casing"). For such casings, use is made of compositions which can be directly applied in liquid form onto foodstuffs by, for example, co-extrusion or by immersing the foodstuff in the coating composition or spraying it therewith. Casings can also be manufactured by extrusion, for example, and then be filled with a foodstuff.

The coating is usually gelled, optionally after application to the foodstuff, by bringing it into contact with a gelling agent, as a result of which the coating material gels, therewith obtaining the desired hardness. In the case of co-extrusion, for example, this gelling takes place after the co-extrusion. When the casing is formed after extrusion, for example, it is then gelled before being filled with the foodstuff.

In particular in the case of extrusion or co-extrusion, the rheological properties and especially the viscosity of the coating composition play a major role. If the viscosity is too low, the composition deliquesces before it can be gelled, so that no cohesive casing can be formed. Too high a viscosity can lead to problems in extrusion and undesirable rippling of the casing. For this reason, apart from a gellable component, coating compositions generally contain a component to control viscosity.

From NL-C-102 930 a coating composition is known which mainly comprises water and the polysaccharide alginate, which composition would be suitable for co-extrusion around a foodstuff. Such alginate compositions, however, have been found to be unsatisfactory as coating compositions, because they do not meet the rheological properties which are desired for co-extrusion, for example: because of e.g. the low alginate content (4 w/w %) the viscosity of the composition according to NL-C-102 930, is too low (±30 Pa·s at 18° C.) to be applied with a satisfactory result in co-extrusion.

In order to obtain an acceptable viscosity, attempts were then made in the art to increase the alginate content, but it has been found that the desired viscosity can only be achieved with an alginate content of at least 8 w/w %. Such an alginate content, however, has the disadvantage that too strong gel formation occurs in gelling, leading to a foodstuff with a very unattractive appearance; the risk of rippling and cracking of the casing is thus very high. It has also been found that such an alginate casing from the technical point of view exhibits unsatisfactory adhesion to the food preparation, so that a food product is obtained around which there is a rather loose-fitting alginate casing.

Casings based on collagen are also generally known in the art, and these have been used for a few decades, reference being made for example to NL-A-690339, EPA0 619 077 and WO93/12660.

In the case of co-extrusion in particular, however, collagen has the disadvantage that after application of the casing to the foodstuff the collagen layer is highly vulnerable and should be hardened by removing water and by crosslinking the collagen. The removal of water generally takes place in a brine bath, while the crosslinking generally takes place in a chemical reaction by means of smoking or with the aid of liquid smoke, active crosslinking constituents thereof or smoke derivatives. In this connection reference is made to WO 93/12660. Other suitable crosslinking agents are generally known in the art, such as glutaraldehyde for example. The above-mentioned treatments, however, can have an unwanted effect on the taste of the coated product or product to be coated.

Another significant disadvantage of foodstuff casings containing collagen is that the collagen is of animal origin and is therefore unsuitable for coating vegetarian and kosher food products, for example.

An additional but significant disadvantage for application of protein of animal origin lies in the fact that animal products, and thus also animal protein, are usually barred when a disease such as e.g. BSE or swine fever is found in the animals in question, in order to avoid any risk to public health. In addition, bovine protein may be a carrier of diseases transmissible to man, such as Creutzfeldt-Jakob syndrome for example. In view of the above, the reliability of delivery of animal protein, and thus of coating material which contains it, may be adversely affected, among other things because under many national legislations the manufacturer must be able to prove that his products originate from healthy animals.

Because of the disadvantages of collagen, coating compositions have been produced which do not contain any collagen. Thus WO-99/55165 describes a collagen-free coating composition which comprises a combination of negatively charged gellable polysaccharides with a protein, where both the polysaccharides and the protein can work as gellable constituents, as well as for control of the viscosity. For this purpose such a composition contains 10 w/w % or more protein, which can also be of animal origin.

When protein in such quantities has been incorporated into a coating composition, this often leads to a coating with suboptimal properties. It is thus necessary to crosslink the coating composition after co-extrusion, which, as has already been described above, may affect the taste of the food product, and many proteins tend to colour the casing when the food product given a casing is boiled or fried, for example.

It is therefore an object of the invention to provide a coating composition which has the desired rheological properties, which can be formulated independently of proteins, with which a sufficiently robust and stable casing can be formed using the extrusion or co-extrusion techniques that are commonly used in the food industry.

Surprisingly, this object is achieved through an improved coating composition for foodstuffs of the above-mentioned type, in which the composition comprises at least a second polysaccharide which is neutral in the composition. The concept "neutral polysaccharide" is generally known in the art; this means a polysaccharide which essentially does not contain any charged groups and is preferably free of charged groups. The neutral polysaccharide is uncharged at pH values which are commonly used in the food industry when using polysaccharide-based coating compositions. Thus, the pH value will preferably lie between 4.0 and 9.5 when alginate for example is used in the composition; when pectin is used, the pH preferably lies between 2.0 and 9.5. When alginate in particular is used, these pH values lie more preferably between 4.5 and 7.5, even more preferably between 4.0 and 6.0, even more preferably between 4.5 and 5.5 and most preferably the pH is 5.0.

By incorporating a polysaccharide which is neutral at such a pH value it is possible to obtain a coating composition which possesses the rheological properties required for extrusion or co-extrusion. Neutral polysaccharides have been found to be eminently suitable for setting the right viscosity of the composition, essentially without adversely affecting the gelling of the gellable polysaccharide. The invention thus makes it possible to provide a polysaccharide-based coating composition with which casings are produced which possess sufficient robustness and are essentially not vulnerable to damage in subsequent treatments. Examples of suitable neutral polysaccharides are cellulose, methylcellulose, hydroxypropylcellulose, methylethylcellulose and galactomannans (such as e.g. guar gum, tara gum and carob meal).

The expression "not adversely affect the gelling" means that by addition of the relevant neutral polysaccharides in a solution of gel-forming polysaccharides, such as alginate for example, gelling of the gel-forming polysaccharides is possible in a comparable way and to a comparable extent as in the absence of the neutral polysaccharides, when gelling is carried out in the way that is usual in the art.

The term "polysaccharide" also includes salts and acids of polysaccharides, as well as combinations thereof, and of combinations of two or more polysaccharides. The polysaccharides of the coating composition according to the invention are preferably edible polysaccharides, in order to provide an edible coating.

Foodstuffs which can be coated with the composition according to the invention are generally known in the art, and include for example paste-like food preparations for the production of various types of sausage and other meat and fish products or products which contain vegetables and/or cheese, for example.

Another advantage of the invention is that the casing does not need to contain any proteins, so that the above-mentioned disadvantages of casings containing proteins are avoided, such as for example the colouring of the coated foodstuff when this product is boiled and/or fried.

With the composition according to the invention it is thus possible to obtain a satisfactory casing for a foodstuff, in which the disadvantages of protein, especially collagen, such as those associated with water removal and crosslinking, can be obviated—which can yield considerable savings in equipment and production time. Because the casing does not need to be crosslinked after gelling, it is also possible, with the composition according to the invention, to give fresh products a coating skin—something which has hitherto been found to be scarcely possible with coating compositions based on collagen, because of the crosslinking reaction with liquid smoke which affects the taste.

Negatively charged polysaccharides which gel under the influence of cations (hereinafter referred to as gel-forming polysaccharide) are generally known in the art and have been used for several decades in the food industry. Such a polysaccharide, or a salt or acid thereof, is usually dissolved in the coating composition and the polysaccharides are gelled by bringing them into contact with a solution which contains cations. The cations undergo an electrostatic interaction with the gel-forming polysaccharides, as a result of which the latter form an undissolved complex with the cations and thus gelling occurs. Depending on the polysaccharide used, monovalent or bivalent cations are applied for this purpose, as is known to the person skilled in the art. It is thus known, for example, that carrageenan gels in the presence of $K^+$ ions and that alginate gels in the presence of bivalent ions, preferably $Ca^{2+}$ ions.

In the coating composition according to the invention the first polysaccharide is preferably chosen from the group consisting of alginate, pectin, carrageenan or a combination of two or more thereof. Said polysaccharides, especially alginate, have been found to be highly suitable for use as the gel-forming polysaccharide in the coating composition according to the invention.

When pectin is used as the gel-forming polysaccharide, the preferred form is low-esterified pectin, in which less than 50% of the carboxylate groups of pectin is esterified with a methyl group (methyl alkylate). The low-esterified pectin has been found to be highly suitable for forming a good-quality coating skin.

DETAILED DESCRIPTION OF THE INVENTION

In a preferred embodiment of the invention, the gel-forming first polysaccharide of the composition according to the invention comprises alginate. Alginate has for example the advantage that the casing can be exposed to high temperatures, as is for example the case when the coated food product is boiled or fried, while the good properties of the casing, e.g. flexibility, strength and stretchability, are retained. In addition, alginate has good gelling properties.

In order to obtain a good, robust and smooth casing, the coating composition according to the invention advantageously comprises 1-7 w/w %, preferably 2-4 w/w % and most preferably 2.3-3.0 w/w % of the first polysaccharide, preferably alginate.

In a favourable embodiment of the coating composition the second polysaccharide comprises galactomannans. Galactomannans have been found to be highly suitable for controlling the viscosity, which is of especial importance in extrusion or co-extrusion, and do substantially not affect the gelling of the gel-forming polysaccharides, because of the neutral character of the galactomannans in the above-mentioned pH range. The lack of any charge on the galactomannans prevents them from taking part in the electrostatic interactions between the gelling agent and the gel-forming polysaccharides during the gelling. Examples of galactomannans are carob gum, tara gum and guar gum, with guar gum, carob gum or a combination thereof being preferred.

Thus galactomannans, in particular guar gum, are highly suitable for bringing the viscosity to the proper value, it being possible to incorporate a suitable quantity of the gellable polysaccharide into the composition in order to create a desired robustness and texture. While the viscosity can be controlled in a suitable way for co-extrusion in particular, the good gelling properties of the gel-forming polysaccharides, particularly alginate, are retained.

In a very advantageous embodiment the galactomannans in the coating composition comprise guar gum. Guar gum in fact has the advantage that unlike other galactomannans it is soluble when cold, i.e. at 4° C., as a result of which the processability of the coating composition is improved, since one can omit the heating step necessary for dissolving many other polysaccharides and one can work at the desired process temperatures. This gives a saving in time and energy.

It has been found that when the composition comprises 2-10 w/w %, preferably 3-6 w/w % galactomannans, preferably guar gum, an optimal casing can be obtained. It has in fact been found that when the galactomannans are used in these concentrations, the viscosity of the composition can be controlled in a way which is very suitable for extrusion or co-extrusion, it being possible to incorporate a suitable quantity of the gelling polysaccharide into the composition in order to form an optimal casing.

The viscosity of the coating composition is preferably 80-110 Pa·s at a temperature of 20° C., so that the composition can be used very efficiently for extrusion and co-extrusion.

The person skilled in the art will realize that the viscosity also depends on the temperature of the composition. Thus, at low working temperatures (0-5° C.) for example, less of the neutral polysaccharide needs to be added in order to achieve the desired viscosity.

A casing or a food product co-extruded with a coating composition, the coating composition comprising guar gum and alginate, is/comprises an optimal coating skin which, regarding robustness and texture, is comparable with the current coating skins based on protein, or even surpasses them. Thus a food product with a coating skin which contains alginate and guar gum can even be fried without the coating skin being damaged. This is scarcely possible with products with a protein coating, such as a co-extruded collagen coating.

As has already been explained above, the composition is eminently suitable for forming a protein-free coating composition. In a preferred embodiment the composition and also the casing are therefore protein-free. If desired, however, the composition can contain protein.

In a particular embodiment according to the invention the composition comprises 0-4 w/w % protein. Such a low quantity of protein can be incorporated into the coating composition for a number of advantageous reasons; it can for example promote binding between the casing and the foodstuff. Globular proteins in particular, such as collagen, have been found to be suitable for this purpose. By incorporating such a protein into the coating composition the bond between the coating skin and the coated food preparation can be improved, especially in the case of co-extrusion, so that a food product is obtained in which improved adhesion of the skin to the food contents is obtained. A composition with optimal adhesion properties is obtained when the coating composition comprises 0.5-2.5 w/w %, preferably 1-1.5 w/w % protein, e.g. collagen. In this composition the collagen acts mainly as a binding protein, and does not play a role in the robustness of the casing. The gelled alginate ensures the robustness of the coating skin. It should be pointed out in this connection that the coating after gelling, in order to obtain said adhesion properties, is preferably subjected to a crosslinking reaction of the protein, e.g. by bringing the casing after the co-extrusion and gelling into contact with liquid smoke, an active crosslinking constituent thereof or a smoke derivative. It has also been found that in this connection the pH of the coating composition in the presence of protein preferably lies between 6.5 and 8.5, because outside this pH range the binding properties of the coating composition which are necessary in co-extrusion are obtained in lesser degree. To this end the composition is preferably buffered in view of the subsequent crosslinking reaction, which generally takes place under acid conditions. Preferred examples of suitable buffers are organic buffer systems, especially lactic acid/lactate, citric acid/NaOH and acetic acid/acetate buffers.

Protein can also be incorporated in order to give the food product a more attractive appearance, especially with regard to the colour. The protein content is then preferably 1 w/w % at most, at which concentration the protein generally does not make any essential contribution to the structure of the coating skin, and a crosslinking reaction is thus usually not necessary. At a content of 4 w/w % at most, the protein will essentially not make any contribution, i.e. will at most make a negligible contribution, to the viscosity and the gelling properties of the coating composition.

The coating composition can also contain a wetting agent, such as glycerol, propylene glycol, edible oil or ethanol. A wetting agent has a positive effect on the consistency, especially the plasticity of the casing. The wetting agent content is preferably 2-8 w/w %. The composition can also contain other additives, such as colorants and aromatic substances, preservatives and/or antimicrobial agents which are generally known in the art.

In particular, the invention relates to an edible casing for foodstuffs, in particular a sausage product, which comprises at least a first polysaccharide, which has been gelled under the influence of cations, and a second, neutral polysaccharide. Such a casing can be used and treated in any way which is customary in the art, with it being possible for the casing according to the invention to obtain any desired property, insofar as elasticity, fragility, permeability to air and/or moisture and/or lipids and breaking strength are concerned, in a way which is known to the person skilled in the art.

The invention also relates to a method for producing an edible casing, comprising the steps of:

a) extruding a coating composition according to the invention to obtain an extruded coating composition, and b) bringing the extruded composition into contact with a gelling agent in order to form a gelled casing.

The method according to the invention makes it possible to obtain optimal casings with the extrusion process under optimal process conditions by incorporating such a quantity of gelling polysaccharide into the composition by which a desired gelling can take place with the formation of a casing with the desired quality, and incorporating such a quantity of the neutral polysaccharide into the composition that the composition obtains the proper rheological properties, such as viscosity. After extrusion and gelling of the composition, the casing obtained can be subjected to one or more additional treatments, such as drying, coating of the casing, in order to prevent it being influence by the foodstuff for example, or cutting the casing into parts. Food preparations, can then be incorporated into the casings.

An attractive embodiment of the invention provides, in a method such as described above, for the production of a foodstuff by means of co-extrusion, where the coating composition in step a) is co-extruded around a foodstuff to be coated. Because of the extremely suitable rheological and gelling properties of the coating composition according to the invention, the latter can be used very efficiently for co-extrusion. One of the advantages of co-extrusion is that complete foodstuffs, including the casing, can be manufactured very quickly in a continuous process.

Especially when a casing is formed which contains alginate, which is preferable, the gelling agent preferably contains bivalent cations, more preferably alkaline-earth metal cations and even more preferably $Ca^{2+}$ ions. In this connection a water-soluble salt, preferably an alkaline-earth salt, such as a salt of magnesium, or more preferably a salt of calcium, is preferably used as the gelling agent.

The bringing of the co-extruded food product into contact with a gelling agent usually takes place directly after the co-extrusion, by immersing the co-extruded food product in a bath which contains calcium chloride, calcium lactate or calcium acetate, with the concentration of $Ca^{2+}$ ions usually being 0.5M. Gelling can also take place by bringing the co-extruded food product into contact with calcium ions in some other way, such as spraying or spreading with a calcium-containing solution for example.

The co-extruded food product is usually brought into contact with a bath containing calcium$^{2+}$ for 5-10 seconds, with the temperature of the bath being about 20° C. and the calcium ion concentration being about 0.5M.

In view of the teaching given herein, a person skilled in the art will be able, without any inventive skill, to choose the right amount of the neutral polysaccharide to obtain the desired rheological properties, such as the viscosity of the coating composition according to the invention, in order to provide a coating composition which is optimally suited for co-extrusion.

It has been found that the quantity of available water in the coated foodstuff, also expressed in the art as the aW value, which can vary between 0 and 1, plays a significant role in the stability of the casing according to the invention. The aW value is preferably as low as possible. If there is a large quantity of available water (high aW value), there is unwanted water transport and thus ion transport between the foodstuff and the casing. In such a situation the bivalent cations used for gelling can, for example, be replaced in the casing by monovalent cations from the foodstuff, as a result of which the insoluble complexes of the polysaccharide and the bivalent cation disintegrate and dissolve. This is, so to speak, a reversal of the gelling process and can lead to the coating dissolving and being lost. Sodium phosphates in particular in the coating foodstuffs are a source of monovalent cations. The above-mentioned disintegration process also occurs in the presence of $Ca^{2+}$-binding substances, such as di- and triphosphates, which are commonly used in the food industry.

The ion exchange and thus the decomposition of the casing are also prevented by limiting the quantity of available water. This can be achieved by, for example, drying the foodstuff after coating, freezing the coated foodstuff or choosing a food preparation in which the quantity of available water is limited, such as a sausage paste for the English breakfast sausage known in the art, or dry sausage types.

It is also possible to prevent the dissolution of the casing by adding to the foodstuff cations with which the gelling polysaccharide gels, such as calcium for example, so that the abovementioned disadvantageous exchanges are limited. When the foodstuff is kept in an aqueous environment, such as in the case of canned or pickled sausage, the same effect can be obtained when such cations are incorporated in the aqueous environment. A gel-forming polysaccharide, such as alginate, can also be added to the foodstuff in order to sequester the cations which are disadvantageous for the gelling. These additions, however, can have a disadvantageous effect on the taste and/or texture of the foodstuff.

Surprisingly it has also been found that the stability of the casing of a coated foodstuff manufactured by the method according to the invention can be increased by bringing the coated foodstuff after gelling into an acid environment, the pH of which is 3 or less. To this end the coated foodstuff can for example be sprayed with or immersed in an acid solution. Such a solution preferably contains liquid smoke, a component or derivative thereof, acetic acid or lactic acid, or a combination of two or more thereof. A person skilled in the art, however, can readily provide other suitable acid solutions to improve the stability of the coating skin.

The acid environment preferably contains acid smoke, a component or derivative thereof. Without being considered to be tied to any explanation, it is thought that these components, unlike what happens in th presence of crosslinkable proteins in the casing, such as collagen, do not play any role in a crosslinking reaction of the polysaccharides present in the casing, but undergo a crosslinking reaction with proteins which are present in the coated foodstuff.

In order to give the casing permanent robustness, irrespective of the free cation content of the coated foodstuff or foodstuff to be coated, in a preferred embodiment of the invention the formed casing is brought into contact with a solution, the solution comprising 0.1-0.5, preferably 0.25 w/w % acetic acid, 0.1-0.5, preferably 0.25 w/w % lactic acid and 0.1-1.0, preferably 0.5 w/w % liquid smoke or smoke derivative.

It should be noted that the coating composition according to the invention can, if desired, be applied only partially to the foodstuff, so as to obtain an only partially coated foodstuff.

The invention also relates to a casing obtainable by the method according to the invention, as well as to a foodstuff comprising such a casing. The casing has many applications and can for example be used for coating sausage products, cut vegetable products, as well as for (partially) covering of foodstuffs such as leaf vegetables, in order to e.g. prevent brown discoloration of cut edges and to guarantee longer freshness.

The invention will be explained in greater detail below by means of some examples. The stated percentages are percentages by weight, unless otherwise indicated.

EXAMPLES

Preparation of Sausage Dough 10.3 parts by weight of lean pork and 14.7 parts by weight of neck are minced through a 3 mm mincer. With this are mixed 2.7 parts by weight of ice, 0.018 parts by weight of nitrite curing salt, 0.002 parts by weight of phosphate, 0.001 parts by weight of ascorbate, 0.001 parts by weight of flavour enhancer, 0.003 parts by weight of white pepper, 0.001 parts by weight of mace, 0.0005 parts by weight of coriander and 0.001 parts by weight of ginger, after which blending to the desired degree of fineness is carried out.

Preparation of Vegetarian Sausage Filling

For the preparation of vegetarian sausage filling, 3 dry mixtures are first made:

|  |  | % by wt. |
| --- | --- | --- |
| Mixture 1 | egg protein | 18 |
|  | wheat protein | 32 |
|  | milk protein | 38 |
|  | common salt | 12 |
| Mixture 2 | wheat fibre | 25 |
|  | tapioca starch | 75 |
| Mixture 3 | Textured wheat | 50 |
|  | Vegetables and herbs | 50 |

15 parts by weight of Mixture 1 are blended with 14 parts by weight of oil until homogeneous, then 55 parts by weight of water are blended through Mixture 1, after which 7 parts by weight of Mixture 2 are added and blended until homogeneous. Finally, 9 parts by weight of Mixture 3 are added and mixed at low speed. The vegetarian sausage dough prepared in this way is used as the filling for the casings.

Comparative Example 1

In a Hobart bakery mixer, fitted with a dough hook, 500 g of sodium alginate (Manugel DMB-Kelco) is mixed with 500 g of propylene glycol. 9000 g of water is then gradually added. After addition of the water, mixing is carried out for a further 15 minutes in the highest position of the machine. Subsequently, the product is de-aerated under vacuum in a Stephan high-speed cutter. The product contains 5% alginate and has an apparent viscosity of 15 Pa·s. Further processing of this product in a STORK-MPS co-extruder is not possible, because the viscosity is too low. The product flows out of the machine and cannot be made into a homogeneous casing film.

Comparative Example 2

The same as under comparative example 1, except that 800 g of alginate is mixed with 800 grams of propylene glycol, after which 8400 g of water is gradually added. The product contains 8% alginate and has an apparent viscosity of 85 Pa·s. The product is extruded together with the sausage dough described above or the vegetarian sausage dough in a STORK-MPS co-extruder. The sausage formed with a diameter of 15 mm is passed for 5 seconds through a 5% $CaCl_2$ solution, after which it is portioned into units of 10 cm. The products are then pre-dried for 20 minutes at 75° C. Finally the products are pre-heated for 10 minutes in a steam cooker at 85° C. After cooling they are vacuum-packed. Result: the initial skin formation is satisfactory. The gel formed, however, is so strong and exhibits so much shrinkage during pre-drying that the products tear open, especially at the ends, and the filling comes out.

Example 1

The same as under comparative example 2, except that 250 g of alginate and 500 g of guar gum are mixed with 750 g of propylene glycol, after which 8500 g of water is gradually added. The product contains 2.5% alginate and 5% guar gum and has an apparent viscosity of 100 Pa·s. The product is further processed as described under comparative example 2. Result: the product forms a good homogeneous coating skin which has a high mechanical resistance directly after gelling and which remains intact after drying and pasteurization. The sausage formed exhibits well closed ends, with no escape of the filling. The final product retains its integrity during sterilization, baking, boiling and frying.

Example 2

The same as under example 1, except that the coating composition is manufactured in a dish cutter, without addition of propylene glycol. The product thus contains 2.5% alginate and 5% guar and has an apparent viscosity of 105 Pa·s. After further processing the product gives comparable results to those described under example 1.

Example 3

The same as under example 2, except that 250 g of alginate and 350 g of guar in a dish cutter are dissolved in 7400 g of phosphate/lactate buffer with a pH of 7.5. Then 2000 g of collagen composition (430SCL-PV industries) with a protein content of 5% is thoroughly mixed with this. The product contains 2.5% alginate, 3.5% guar and 1% collagen protein. It has an apparent viscosity of 95 Pa·s and a pH of 6.7. The product is further processed as described under example 2. Result: the product forms a good homogeneous coating skin which has a high mechanical resistance directly after gelling and remains intact after drying and pasteurization. The sausage formed exhibits well closed ends, with no escape of the filling. In addition, the adhesion of the casing to the contents is greatly improved. The final product retains its integrity during sterilization, baking, boiling and frying.

Example 4

The same as under example 3, except that 200 g of alginate and 250 g of guar in a dish cutter are dissolved with 5550 g of phosphate/lactate buffer with a pH of 7.5. Then 4000 g of collagen composition with a protein content of 5% is thoroughly mixed with this. The product thus contains 2% alginate, 2.5% guar and 2% collagen protein. It has an apparent viscosity of 90 Pa·s and a pH of 6.5. The product is further processed as described under example 2, except that a small quantity of a liquid smoke derivative (2%) is added to the gelling bath, in order to promote the crosslinking of the collagen. Result: the product forms a good homogeneous coating skin which has adequate mechanical resistance directly after the gelling bath, as a result of which no belt marks occur during transport in the system. The sausage exhibits well closed ends and the casing gives good adhesion to the contents after drying and pasteurization.

Example 5

Preparation of Sausage Casing by Extrusion 9250 g of water are put into a dish cutter. After the machine is started, 250 g of sodium alginate (manugel DMB-Kelco) is slowly added. After the addition the machine is run in the highest position for 5 minutes. 25 g of 50% lactic acid and 25 g of 50% acetic acid are then mixed in. Subsequently, 450 g of guar gum is blended in until a homogeneous paste is obtained. The product is de-aerated under vacuum in a Stephan high-speed cutter.

The paste has an apparent viscosity of 95 Pa·s and a pH of 4.9. The paste is pressed with a sausage filling machine fitted with a concentric die, the central opening of which is closed off (the gap width is 0.35 mm in this system).

At a pressure of 10 bar a "paste cylinder" is thus formed with a diameter of 20 mm. Directly after leaving the die, the paste is fixed by spraying with a 5% $CaCl_2$ solution. The cylinder shape is maintained by blowing air in. The sausage skin is finally dried for 1.5 hours at 50° C. The dried skin has a thickness of 55 microns.

The "coating" thus formed is filled with the earlier described sausage dough and the vegetarian sausage dough. The sausages are then subjected to various processes, such as boiling, baking and frying. In all cases the skin retains its integrity and the sausages have an attractive appearance.

The invention claimed is:

1. Extrudable or co-extrudable water-based composition, suitable for forming a casing for foodstuffs, which comprises water as the major component, a first polysaccharide that is negatively charged in the composition and gels under the influence of cations, the first polysaccharide comprising alginate, and at least a second polysaccharide that is neutral in the composition, the second polysaccharide comprising galactomannans, the composition comprising 2-7 w/w % alginate and 0-4 w/w protein, and having a viscosity of 80-110 Pa·s at a temperature of 20° C., the composition being free of calcium ion binding compounds that would reverse gelling of the composition.

2. The composition according to claim 1, wherein the composition comprises 2-4 w/w % alginate.

3. The composition according to claim 2 wherein the composition comprises 2.3-3.0 w/w % alginate.

4. Composition of claim 1, wherein the galactomannans are chosen from the group consisting of guar gum, carob gum or a combination thereof.

5. Composition of claim 1, wherein the galactomannans comprise guar gum.

6. Composition of claim 1, wherein the composition comprises 2-10 w/w % galactomannans.

7. The composition according to claim 6 comprising 3-6 w/w % galactomannans.

8. The composition according to claim 6 wherein the galactomannan is guar gum.

9. Composition of claim 1, wherein the pH of the composition lies between 4.0 and 7.5.

10. The composition according to claim 9 wherein the pH of the composition is between 4.0 and 6.0.

11. The composition according to claim 10 wherein the pH of the composition is between 4.5 and 5.5.

12. The composition according to claim 11 wherein the pH of the composition is 5.

13. The composition according to claim 1 wherein the composition includes a wetting agent.

14. The extrudable or co-extrudable composition according to claim 1, wherein the composition has a pH between 4.0 and 6.7.

15. Composition of claim 1, wherein the composition is free of protein.

16. A method for producing a foodstuff having an edible casing, comprising the steps of:
    a) extruding a water-based composition comprising water as the major component, a first polysaccharide that is negatively charged in the composition and gels under the influence of cations, the first polysaccharide comprising alginate, and at least a second polysaccharide that is neutral in the composition, the second polysaccharide comprising galactomannans, the composition comprising 2-7 w/w % alginate and 0-4 w/w protein, and having a viscosity of 80-110 Pa·s at a temperature of 20° C., to obtain an extruded casing composition;
    b) bringing the extruded casing composition into contact with a gelling agent to form a gelled casing; and
    c) filling the gelled casing with a foodstuff.

17. A foodstuff having an edible casing, obtained by the method according to claim 16.

18. The method according to claim 16, further including the step of de-aerating the composition under vacuum prior to said extruding step.

19. A method according to claim 16, wherein the foodstuff is substantially free of added alginates.

20. A method in accordance with claim 16, wherein said water-based composition is free of protein.

21. A foodstuff with a casing wherein the casing of the foodstuff comprises a water-based composition which comprises water as the major component, a first polysaccharide that is negatively charged in the composition and gels under the influence of cations, the first polysaccharide comprising alginate, and at least a second polysaccharide, that is neutral in the composition, the second polysaccharide comprising galactomannans, the composition comprising 2-7 w/w % alginate and 0-4 w/w protein, and having a viscosity of 80-110 Pa·s at a temperature of 20° C., and wherein the foodstuff is substantially free of added alginate.

22. A foodstuff in accordance with claim 21, wherein said water-based composition is free of protein.

23. A method for producing a foodstuff having an edible casing, comprising the steps of:
    a) co-extruding a foodstuff and an edible casing therearound, said edible casing comprising a water-based composition comprising water as the major component, a first polysaccharide that is negatively charged in the composition and gels under the influence of cations, the first polysaccharide comprising alginate, and at least a second polysaccharide that is neutral in the composition, the second polysaccharide comprising galactomannans, the composition comprising 2-7 w/w % alginate and 0-4 w/w protein, and having a viscosity of 80-110 Pa·s at a temperature of 20° C.; and
    b) bringing the co-extruded casing composition into contact with a gelling agent to form a gelled casing.

24. Method according to claim 16 or claim 23, wherein the composition after step b) is brought into an acid environment, the pH of which is 3 or less.

25. Method according to claim 24, wherein the acid environment is selected from the group consisting of liquid smoke, a component or derivative thereof, lactic acid, acetic acid and mixtures thereof.

26. Method according to claim 25, wherein the acid environment is a solution comprising 0.1-0.5 w/w % acetic acid, 0.1-0.5 w/w % lactic acid and 0.1-1.0 w/w % liquid smoke or a derivative thereof.

27. The method according to claim 26 wherein the solution comprises 0.25 w/w % acetic acid, 0.25 w/w % lactic acid, and 0.5 w/w % liquid smoke or a derivative thereof.

28. A foodstuff having an edible casing, obtained by the method according to claim 23.

29. The method according to claim 23, further including the step of de-aerating the composition under vacuum prior to said co-extruding step.

30. A method in accordance with claim 23, wherein said water-based composition is free of protein.

* * * * *